(12) United States Patent
Ohno et al.

(10) Patent No.: US 7,296,277 B2
(45) Date of Patent: Nov. 13, 2007

(54) DISK ROTATION DEVICE

(75) Inventors: Takehide Ohno, Kanagawa (JP); Fumihiro Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 316 days.

(21) Appl. No.: 11/012,198

(22) Filed: Dec. 16, 2004

(65) Prior Publication Data
US 2006/0010457 A1    Jan. 12, 2006

(30) Foreign Application Priority Data
Dec. 19, 2003   (JP)   ............................. 2003-421789

(51) Int. Cl.
*G11B 17/04*   (2006.01)
(52) U.S. Cl. .................................... 720/602
(58) Field of Classification Search ................ None
See application file for complete search history.

(56) References Cited

U.S. PATENT DOCUMENTS

| | | | |
|---|---|---|---|
| 5,025,437 A * | 6/1991 | Yamashita et al. ............. | 369/79 |
| 5,140,572 A | 8/1992 | Kibune et al. | |
| 5,777,960 A | 7/1998 | Ohno | |
| 5,883,870 A * | 3/1999 | Akiba et al. ................. | 720/602 |
| 2002/0018426 A1 * | 2/2002 | Minase ....................... | 369/75.2 |
| 2003/0112726 A1 | 6/2003 | Ohno | |
| 2004/0057353 A1 | 3/2004 | Ohno et al. | |
| 2004/0100894 A1 | 5/2004 | Ninomiya et al. | |

FOREIGN PATENT DOCUMENTS

| | | |
|---|---|---|
| JP | 01-204270 | 8/1989 |
| JP | 07-210984 | 8/1995 |
| JP | 09-212999 | 8/1997 |
| JP | 2000-76780 | 3/2000 |
| JP | 3258888 | 12/2001 |
| JP | 2003-228843 | 8/2003 |
| JP | 2004-5875 | 1/2004 |
| JP | 2004-110973 | 4/2004 |

OTHER PUBLICATIONS

Notice of Rejection of Japanese Patent Application 2003-421789, dated May 17, 2007.

* cited by examiner

*Primary Examiner*—A. J. Heinz
*Assistant Examiner*—Mark Blouin
(74) *Attorney, Agent, or Firm*—Dickstein Shapiro LLP (57) ABSTRACT

A disk rotation device rotationally driving a disk includes a housing body, a conveyance body installed in the housing body so as to be capable to move between a first position positioned inside of the housing, the first position being where the disk is rotation driven, and a second position positioned outside of the housing body, the second position being where the disk is put on or taken off, a rotation mechanism provided in the conveyance body and having a rotational part which is rotationally driven by a motor and at which rotational part the disk is set, and a braking device which brakes by applying a friction force to the rotational part in a case where the conveyance body is situated at a side of the second position closer than a designated standard position between the first position and the second position, and which turns off application of the friction force in a case where the conveyance body is situated at a side of the first position closer than the standard position.

12 Claims, 9 Drawing Sheets

FIG.9

DISK ROTATION DEVICE

BACKGROUND OF THE INVENTION

1. Field of the Invention

The present invention relates to disk rotation devices, and more specifically, to a disk rotation device rotationally driving a disk.

2. Description of the Related Art

Regarding recent improvements of digital technologies and technologies for data compression, an optical disk, such as a compact disk (CD) or digital versatile disk (DVD) having the same diameter as the CD where data approximately seven time as much as the data of the CD are recordable, is widely noticed as a medium for recording data such as music, a motion picture, a picture, an illustration and computer software. With the low cost of the optical disk, an optical disk driving apparatus, for which the optical disk is used as a medium for recording and reproducing data, comes into wide use as a peripheral device of personal computers.

Furthermore, recently, as the personal computer is being made miniaturized, light-weight, and thin, a notebook-type personal computer being capable of outside use is in the mainstream. An optical disk driving device installed in the notebook-type personal computer has a limitation of its thickness. Hence, a user himself/herself places the optical disk on a turn table connected to a spindle motor. Accordingly, the spindle motor is pulled out with a tray where the optical disk is mounted at a position where the optical disk is put on or taken off.

In the optical disk driving device, based on a request for discharging the optical disk, a control part electrically brakes the rotation of the spindle motor and a tray is pulled out in a state where the rotation of the optical disk is substantially stopped. Recently, the rotating speed of the optical disk has been made high, so that reproducing at a high speed such as 24 times speed (approximately 5000 rpm) is generally performed. It takes several seconds for such a high speed rotation to be electrically stopped. Hence, there is dissatisfaction of the user who likes to exchange the optical disk quickly.

In addition, the optical disk driving device has an emergency discharge mechanism for forcibly taking off the optical disk in a case where a normal discharging operation does not work due to a sudden power loss or malfunction. Electric braking is not performed by this emergency discharge mechanism. Hence, the optical disk is discharged while it is rotated at high speed and therefore it takes a time more than several tens of seconds to stop the rotation of the optical disk.

Because of this, various devices for reducing a time for stopping the rotation of the optical disk when the optical disk is discharged are suggested. See Japanese Patent No. 3258888 and Japanese Laid-Open Patent Publication No. 2000-76780, for example.

However, a disk reproduction device disclosed in Japanese Patent No. 3258888 has a disadvantage in that the device cannot correspond to optical disks having different diameters, such as a CD having a diameter of 12 cm and a CD having a diameter of 8 cm. Furthermore, in this disk reproduction device, only when the optical disk is situated in a designated area where the optical disk is being moved, an elastic body provided in a housing part comes in contact with the optical disk. Given that the rotational speed of the optical disk will be made higher in the future, it may not be possible to sufficiently reduce the rotational speed of the optical disk.

Furthermore, in the optical disk driving device installed in the notebook-type personal computer, generally, from the perspective of the prevention of degrading of an electrical signal and due to the thickness limitation, a circuit board where an interface with the personal computer is mounted is provided at a rear surface side, which is situated in a direction opposite to a disk discharge direction. Also, a head mechanism, including an optical pick up and an optical pick up sending mechanism, is situated at a discharging direction side (a disk mounting or dismounting position side) closer than the spindle motor. In this disk reproduction device disclosed in the Japanese Laid-Open Patent Publication No. 2000-76780, it is necessary to provide the elastic body coming in contact with the spindle motor at the disk mounting or dismounting position side closer than a position of the spindle motor at the time of reproduction and to avoid an interference between the head mechanism and the elastic body. Thus, the disk reproduction device disclosed in the Japanese Laid-Open Patent Publication No. 2000-76780 has a lot of limitation in design and therefore it is difficult to make the device thinner. Furthermore, in this disk reproduction device, only when the optical disk is situated in a designated area where the optical disk is being moved, an elastic body provided in a housing part comes in contact with the optical disk. Given that the rotational speed of the optical disk will be made higher in the future, it may not possible to sufficiently reduce the rotational speed of the optical disk.

SUMMARY OF THE INVENTION

Accordingly, it is a general object of the present invention to provide a novel and useful disk rotation device in which one or more of the problems described above are eliminated.

Another and more specific object of the present invention is to provide a disk rotation device whereby the rotation of the disk is stopped in a short period of time when the disk is to be taken off.

The above objects of the present invention are achieved by a disk rotation device rotationally driving a disk, including:

a housing body, a conveyance body installed in the housing body so as to be capable to move between a first position positioned inside of the housing, the first position being where the disk is rotation driven, and a second position positioned outside of the housing body, the second position being where the disk is put on or taken off, a rotation mechanism provided in the conveyance body and having a rotational part which is rotationally driven by a motor and at which rotational part the disk is set, and a braking device which brakes by applying a friction force to the rotational part in a case where the conveyance body is situated at a side of the second position closer than a designated standard position between the first position and the second position, and which turns off application of the friction force in a case where the conveyance body is situated at a side of the first position closer than the standard position.

According to the present invention as described above, the braking device turns off application of the friction force in a case where the conveyance body is situated at the side of the first position closer than the standard position. Therefore, in a state where the disk is set in the rotation driving mechanism, when the conveyance body is situated at the side of the first position, namely a position where the disk is rotationally driven, it is possible to rotationally drive the disk by the rotation driving mechanism without holding (braking) the rotation. On the other hand, the braking device brakes by applying the friction force to the rotational part in a case where the conveyance part is situated at the side of the second position closer than a designated standard position between the first position and the second position. Therefore, even in a state where the disk is rotated at a high speed, the braking device starts applying the friction force to the rotational part, when the conveyance body moves and arrives at the standard position on the way from the first position to the second position, for taking out the disk. Because of this, the rotational speed of the disk starts being reduced. After this, as long as the conveyance body is situated at the side of the second position closer than the standard position, the application of the friction force to the rotational part by the braking device continues. Accordingly, it is possible to securely stop the rotation of the disk in a short period of time irrespective of the diameter of the disk.

Other objects, features, and advantages of the present invention will become more apparent from the following detailed description when read in conjunction with the accompanying drawings.

DETAILED DESCRIPTION OF THE PREFERED EMBODIMENTS

A description is now be given, with reference to FIG. 1 through FIG. 9, of embodiments of the present invention.

In this specification and the following claims, a "disk" represents not only an information recording medium such as an optical disk but also includes any disk-shaped materials.

Figure 1:
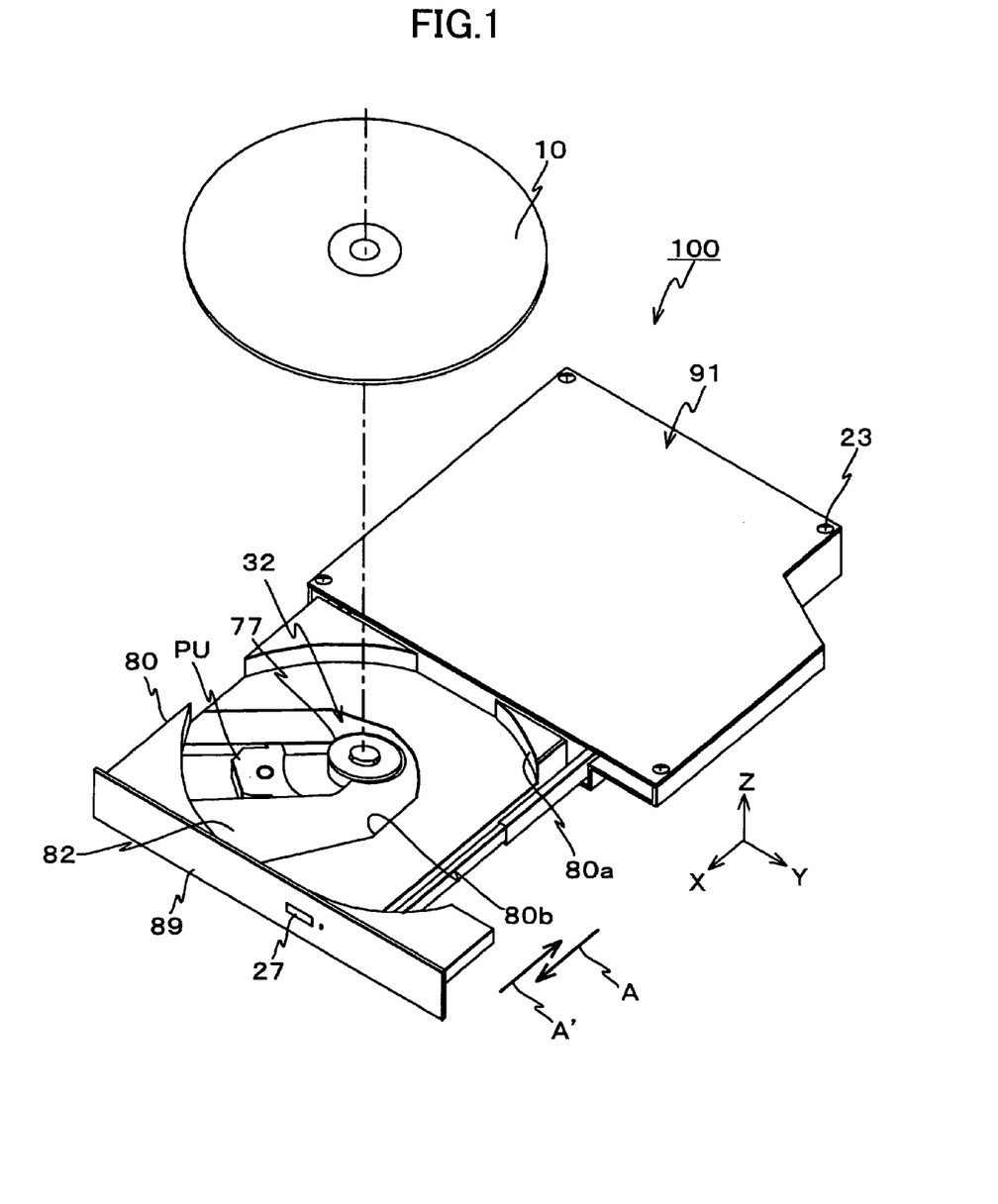
FIG. 1 is a perspective view schematically showing a driving device of an embodiment of the present invention.

FIG. 1 is a perspective view schematically showing an optical device (hereinafter "driving device") 100 of an embodiment of a disk rotation device of the present invention.

The driving device 100 shown in FIG. 1 has a housing part 91, a tray 80, a rotation driving mechanism 32 provided in the tray 80, a head mechanism (See FIG. 3), and others. The X side of the housing part 91 is opened. The tray 80 is attached to the housing body 91 so as to be able to move in reciprocating manner in directions shown by arrows A and A' in FIG. 1. The tray 80 functions as a conveyance body carrying an optical disk 10 as a disk (and an information recording medium) in the housing body 91 and discharging the optical disk 10 to the outside of the housing body 81. In this example, an information recording medium in conformity with a CD group standard such as CD-Recordable (CD-R) or CD-Rewritable (CD-RW) is used as an example of the disk 10.

Figure 2:
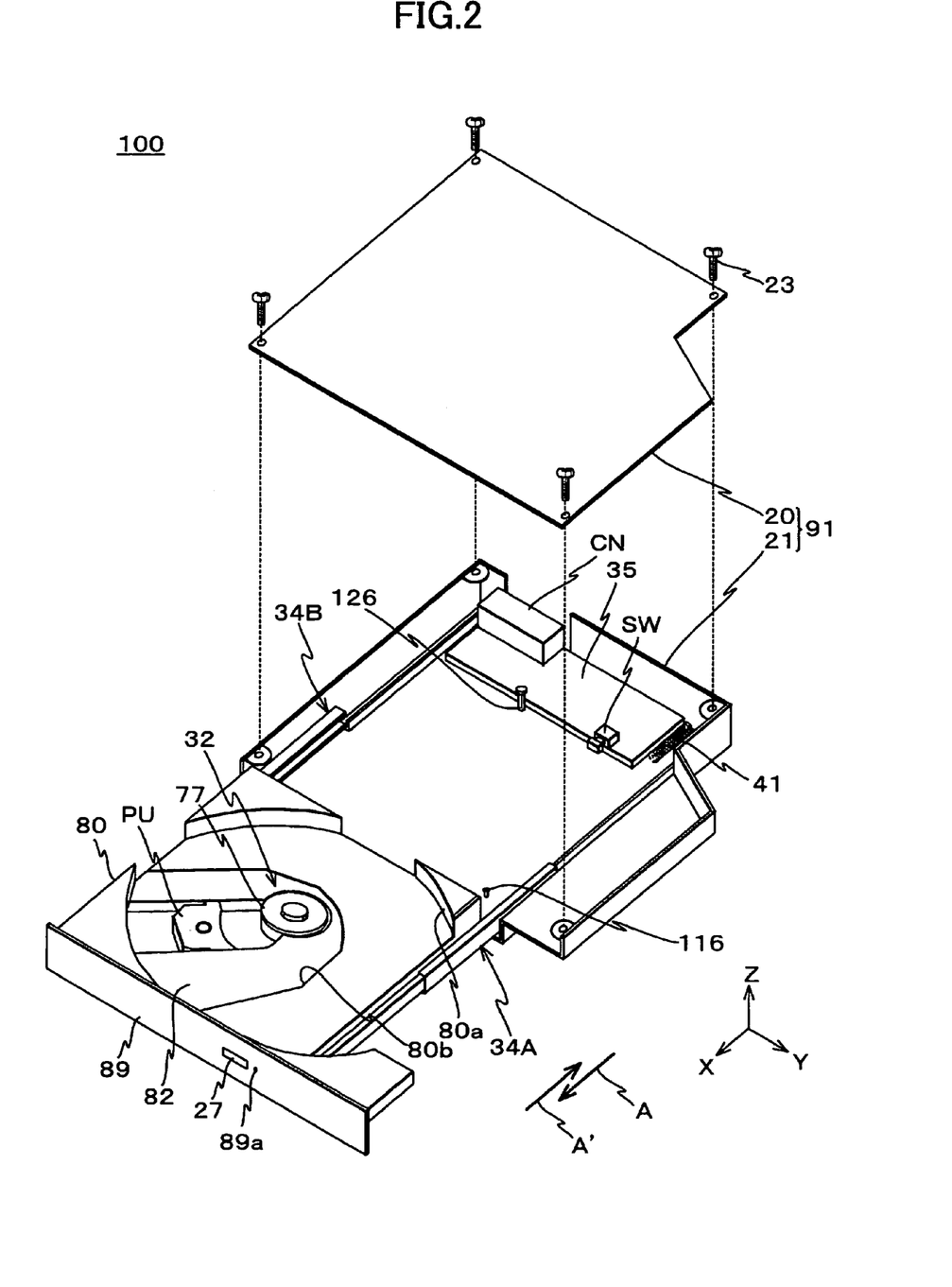
FIG. 2 is an exploded perspective view of the driving device shown in FIG. 1.

As shown in FIG. 2, which is an exploded perspective view of the driving device 100, the housing body 91 includes an upper cover 20 and a lower cover 21. The lower cover 21 has a rectangular configuration where one corner is notched as seen in the plan view. The vicinity of an end part at the Y side of a bottom wall of the lower cover 21 is higher than other parts. The lower cover 21 also includes a side wall provided at a part other than the X side part of the bottom wall. The side wall is formed with the bottom wall in a body. The upper cover 20 is provided so as to cover an upper surface of the lower cover 21. The upper cover 20 and the lower cover 21 are metal parts made by sheet metal working so as to protect against an impact from the outside. The lower cover 21 and the upper cover 20 are screw-fixed in the vicinities of four corners by screws 23.

As shown in FIG. 2, a circuit board 35 is provided in the vicinity of an end part at a side opposite to the side where the housing body 91 is opened of the lower cover 21. A connector CN for connecting cable to a host such as a personal computer, an interface (not shown in FIG. 2) with the host, a control part (not shown in FIG. 2) for controlling the whole of the driving device 100, an LSI where an electric circuit for processing and producing various electric signals is installed, and others are provided on the circuit board 35. A detection switch (limit switch) SW is provided at the circuit board 35 so as to detect as a detector part that the tray 80 is received in the housing body 91. The detection switch SW detects that tray 80 is received in the housing body 91 based on contact with a part of the tray 80.

A tray discharge spring 41 is provided at the Y side of the circuit board 35. The tray discharge spring 41 is made of a compression spring. An elastic force of the tray discharge spring force 41 is always applied to the tray 80 in the X direction in a state where the tray 80 is received in the housing body 91.

An engaging pin 126, as a stopper forming a lifting part of a braking mechanism described below, is fixed to a position slightly separated from the circuit board 35 in the X direction.

That is, the circuit board 35, the tray discharge spring 41, and the engaging pin 126 are provided on the lower cover 21.

The tray 80 is, for example, a plastic article formed by injection molding. A concave part 80a having a substantially circular-shaped configuration and a step is formed on an upper surface, namely a surface at the Z side, of the tray 80. An opening part 80b is formed in a part of the concave part 80a. A part of the opening part 80b is covered with a cover formed by a member the same as the tray 80. A front panel 89 is provided at a front surface, namely the X side surface, of the tray 80. An eject button 27 is provided at the front panel 89. A piercing hole forming part 89a for emergency discharging is formed in the vicinity of the eject button 27.

As shown in FIG. 2, the tray 80 can be slid along the X axis against housing body 91 by guide mechanisms 34A and 34B provided at Y side surfaces. If the tray 80 is situated at a position shown in FIG. 1 or FIG. 2, the concave part 80a is completely exposed to the outside. Hence, in this case, the user can set the optical disk 10 on the tray 80, more specifically the turntable 77 described below, or take off the optical disk 10 from the tray 80, more specifically a turntable 77 described below. Therefore, in the following explanation, the position of the tray 80 shown in FIG. 1 and FIG. 2 is called a disk mounting or dismounting position, namely a second position.

If the tray 80 where the optical disk 10 is set is pushed in the arrow A' direction by the user so as to be received in the housing body 91, the optical disk can be rotationally driven. In the following explanation, the position in this state is called a rotation position, namely a first position. In a case where the tray 80 is in the rotation position, the tray 80 and the circuit board 35 are overlapped in the Z direction so that the size of the whole driving device 100 can be made miniaturized. In addition, if the tray 80 is received in the housing body 91, the opening part of the housing part 91 is closed by the front panel 89.

Figure 3:
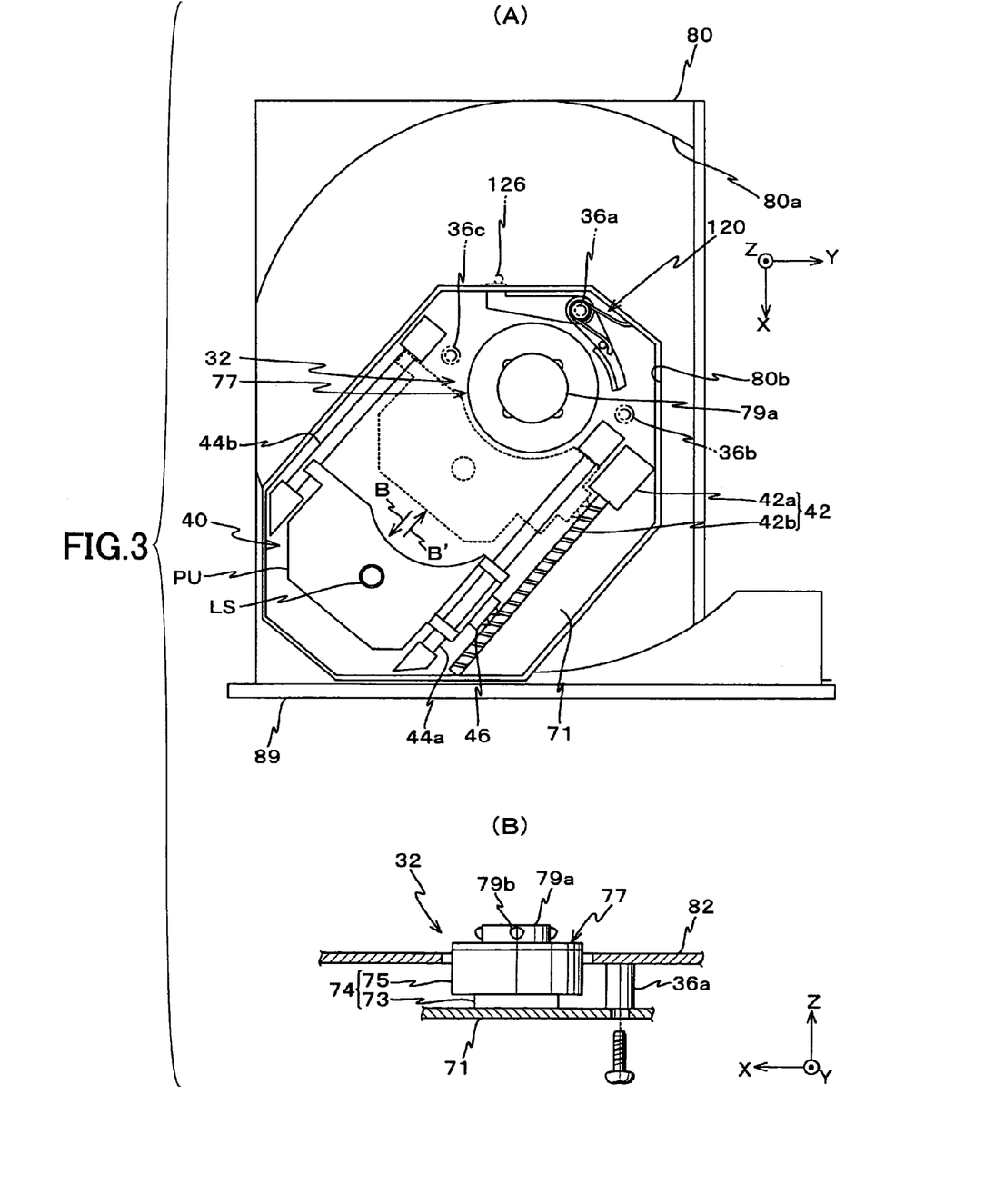
FIG. 3 is a view of a tray 80, more specifically FIG. 3-(A) is a plan view showing a state where a cover 82 is removed from the tray 80 and FIG. 3-(B) is a view showing a state of a part of the tray 80 seen from the Y side.

As shown in FIG. 1 and FIG. 2, the rotation driving mechanism 32 is provided at a substantially center part of the tray 80. As recognized through FIG. 3-(B) schematically showing a state of the vicinity of the rotation driving mechanism 32 seen from the Y direction, the rotation driving mechanism 32 includes a spindle motor 74 and a table 77. The spindle motor 74 has a spindle. The spindle is a shaft extending in the Z direction at a center part of a hollow part of a stator 73. The stator 73 is fixed on the upper surface, namely the Z side surface, of a base 71, and has a donut-shaped configuration. The spindle motor 74 also has a rotor 75 rotatably supported at the base 71 in a state where the shaft is situated in the center. The table 77 is fixed on the upper surface of the rotor 75 of the spindle motor 74.

The base 71 actually has a bottom wall having a substantially same configuration as the opening part 80b of the tray 80 and a side wall provided around the bottom wall, as shown in FIG. 3-(A) showing a state where the cover 82 is removed from the tray 80. The base 71 is screw-fixed against three bosses 36a through 36c shown by a two-dotted line (a virtual line) in FIG. 3-(A) in a state where the base 71 is engaged with the opening part 80b. The bosses 36a through 36c are actually provided at three parts at a rear surface side of the cover 82. That is, the base 71 is screw-fixed to the cover 82 via three bosses 36a through 36c provided at the rear surface side of the cover 82.

The stator 73 forming the spindle motor 74 includes a winding coil and others and is fixed to the shaft of the rotor 75. A permanent magnet is provided at an internal circumferential surface side of a movable part provided in a state where an upper half part of the stator 73 is covered. In the spindle motor 74, the rotor 75 (and the table 77) are rotationally driven in a designated direction, namely clockwise or counterclockwise as seen from the Z direction, in a state where the shaft is the center of the rotation caused by an electromagnetic mutual effect between the permanent magnet provided in the rotor 75 and an electrical current flowing in the coil winding provided in the stator 73. Thus, since the table 77 is rotated with the rotor 75 in a body, the table 77 is called a turn table 77 in the following explanation.

A projection part 79a is provided in the center part of the upper surface side of the turntable 77. The projection part 79a has a circular shaped configuration seen from an upper part. Four hole forming parts (not shown in FIG. 3) are formed on an external circumferential surface of the projection part 79a at an substantially equal interval, namely at an approximately 90 degrees interval. Claw parts 79b are provided inside each of the hole forming parts so as to be capable of being retained. An elastic force of an elastic member such as a spring provided inside of the hole forming part is always applied to the claw part 79b in an outward radial direction. However, the claw parts 79b are not forced out from the projection part 79a.

In a normal state, a head end part of each of the claw parts 79b is exposed (projected) to an outside part of the external circumferential surface of the projection part 79a by the elastic force. An exposed part of the claw part 79b has a mount-shaped configuration seen from a side. Hence, if the user pushes the optical disk 10 onto the turn table 77 in a state where a circular shape opening part situated at the center of the optical disk 10 is consistent with the projection part 79a, an edge part at a lower surface (rear surface) of the circular-shaped opening part situated at the center of the optical disk 10 comes in contact with an upper side tilted surface of the claw part 79b. The claw part 79b is pushed into the inside of the hole forming part by a horizontal component of a force applied to the contact point. Because of this, the optical disk 10 can be set onto the turn table 77. In a state where this setting is completed, a part of the head end of the claw part 79b is projected to the outside of the circular shape opening part situated at the center of the optical disk 10 by the force applied by the elastic member. A projection part of the claw part 79b functions as a stopper so that the optical disk 10 is prevented from being dropped out from the turn table 77 of.

In order to pull off the optical disk 10 from the turn table 77, it is necessary for an edge part at an upper surface side of the circular-shaped opening part of the optical disk 10 to come in contact with a tilted surface at a lower side of the claw part 79b so that the claw part 79b is pushed into the inside of the hole forming part by a horizontal component of a force applied to the contact point. However, when the optical disk 10 is set onto the turn table 77 and the turn table 77 is rotated, a force in a radial outward direction, which is a resultant force of a centrifugal force generated by the rotation, and the force applied by the elastic member are applied to the claw part 79b. Therefore, a situation where the claw part 79b is pushed into the inside of the hole forming part is prevented. In addition, in a state where the turn table 77 is stopped rotating, a force whereby the optical disk 10 is pulled out may not be generated.

When the turn table 77 rotates, by the force in the radial outward direction, which is the resultant force of the centrifugal force generated by the rotation and the force applied by the elastic member being applied to the claw part 79b, the claw part 79b is pushed to a part in the vicinity of the circular-shaped opening part of the optical disk 10 so that idle (slippage) of the optical disk 10 against the turn table 77 can be prevented by a friction force between the claw part 79b and the circular-shaped opening part.

Referring to FIG. 3-(A), the braking mechanism 120 is provided at a side opposite to the front panel 89 in the turn table 77 forming the rotation-driving mechanism 32. Hence, the rotation-driving mechanism 32, the head mechanism 40, the braking mechanism 120, and the eject lock mechanism 110 are moved with the tray 80.

Figure 6:
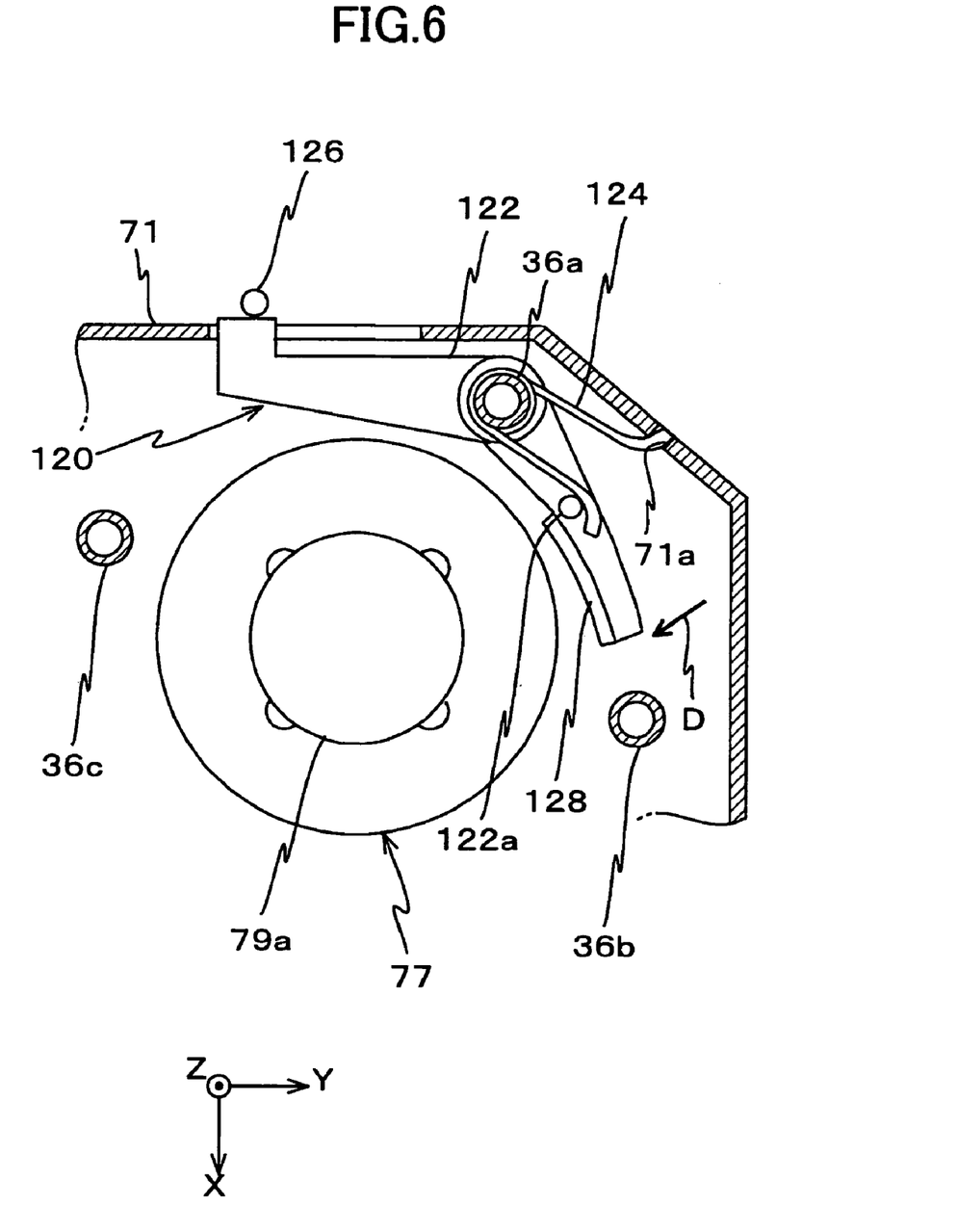
FIG. 6 is an enlarged view showing the vicinity of a braking mechanism shown in FIG. 3.

As enlarged shown in FIG. 6, the braking mechanism 120 includes a braking lever 122 and a torsion spring 124. In a state where the boss 36a is inserted into a piercing hole formed in the vicinity of the center part of the braking mechanism 120, the braking lever 122 and the torsion spring 124 are provided at the cover 82 where the boss 36a is provided. The braking lever 122 functions as a braking member rotatably provided in a state where the boss 36a is the center of the rotation. The torsion spring 124 functions as a force application part that applies a designated force to the braking lever 122 in a direction shown by an arrow D in FIG. 6 so that the braking lever 122 comes in contact with the turn table 77 (and the rotor 75).

As shown in FIG. 6, the braking lever 122 has a bending-shaped configuration as seen in a plan view. The piercing hole where the boss 36a is inserted is formed in the center of the bending part. An elastic body 128 made of rubber or felt, for example, is provided on a surface situated at a side facing the turn table 77 (and the rotor 75) and situated at a head end part (first end part) of a part obliquely extending to right downward from a part where the piercing hole is formed in FIG. 6. Surfaces facing the turn table 77 of the elastic body 128 and the braking lever 122 where the elastic body 128 is provided have circular arch-shaped configurations which are along the external circumference of the turn table 77.

An end part of another side of the braking lever 122, namely a second end part, extends to a left side from the center of the bending part in FIG. 6. A projection part projecting toward to the stopper 126 is formed in a part situated at a side opposite to the surface facing the turn table 77 of a head end of the second end part.

A center part of the torsion spring 124 is wound at the external circumference of the boss 36a. One end of the torsion spring 124 is engaged at a notch part 71a formed in a part of a side wall of the base 71. Another end of the torsion spring 124 is engaged at a side opposite to the turn table 77 of the projection part 122a provided in the vicinity of the first end of the braking lever 122. Therefore, by an elastic force of the torsion spring 124, a rotational moment working clockwise in FIG. 6 is always applied to the surroundings of the piercing hole situated in the center of the braking lever 122. Because of the rotational moment, the force applied to the first end part of the braking lever 122 is in the direction shown by the arrow D in FIG. 6.

Figure 7:
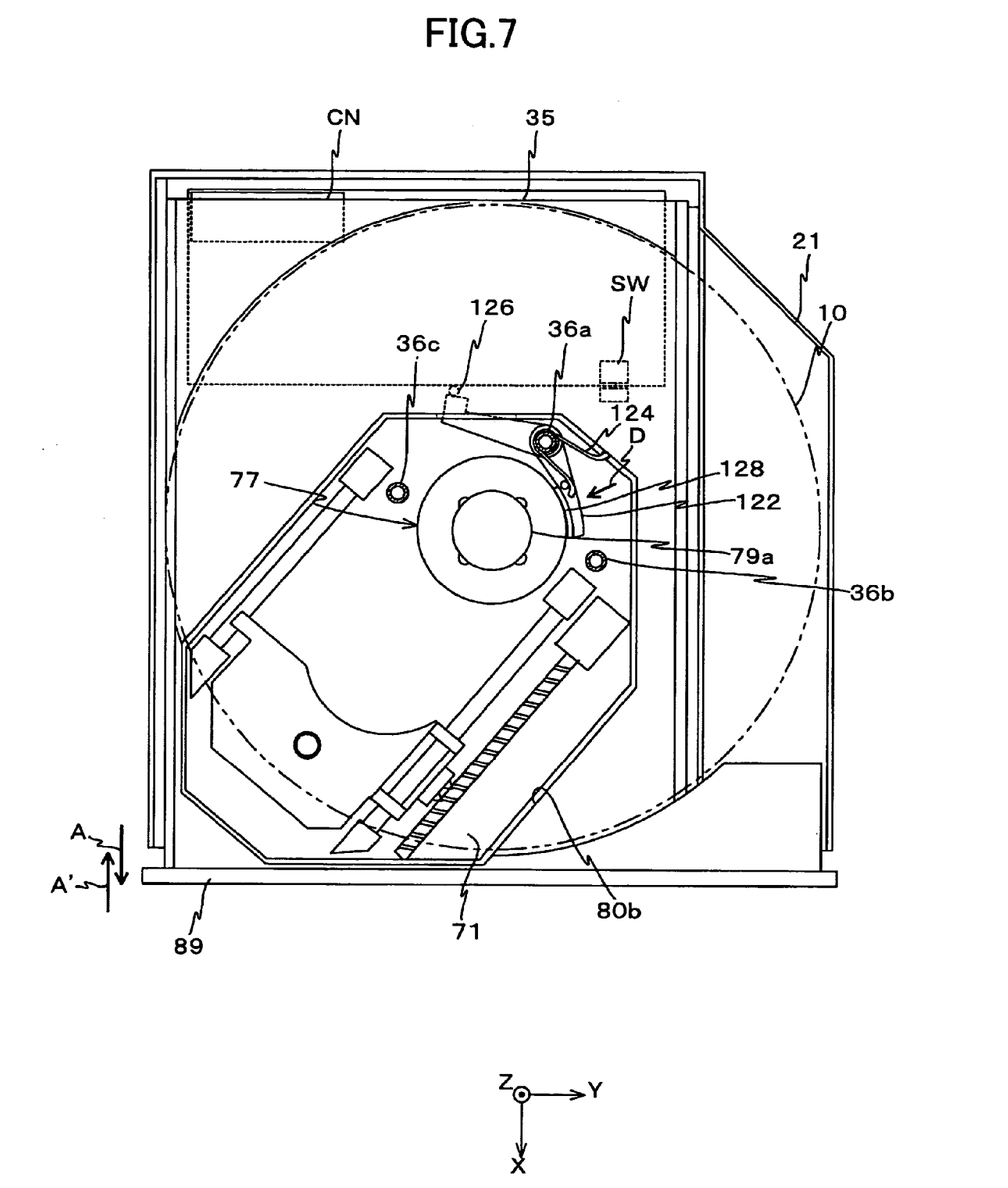
FIG. 7 is a view for explanation of a state of the braking mechanism in a case where the tray is situated in a standard position.

As discussed above, in this embodiment, when the tray 80 is situated at a position shown in FIG. 7, which is between the rotation position and the disk mounting/dismounting position, the surface of the elastic body 128 provided at the first end part of the braking lever 122 comes in contact with the turn table 77 (and the rotor 75) and an end surface of the projection part of the second end part comes in contact with the stopper 126 at the same time. In this case, an counter-clockwise moment applied to the braking lever 122 and the clockwise moment are substantially balanced. A position of the tray 80 satisfying the above-discussed conditions is called "standard position" in the below.

When the tray 80 is situated at a side of the rotation position closer than the standard position, the end surface of the projection part of the send end part of the braking lever 122 is pushed to the engaging pin 126 (with a pressure), so that a force against the elastic force of the torsion spring 124 is applied to the braking lever 122 by the force to push the end surface of the projection part of the send end part of the braking lever 122 to the engaging pin 126. As a result of this, the counterclockwise moment applied to the braking lever 122 becomes larger than the clockwise moment. Because of this, as shown in FIG. 6 (or FIG. 3-(A)), the elastic body 128 becomes separated from the turn table 77.

Figure 8:
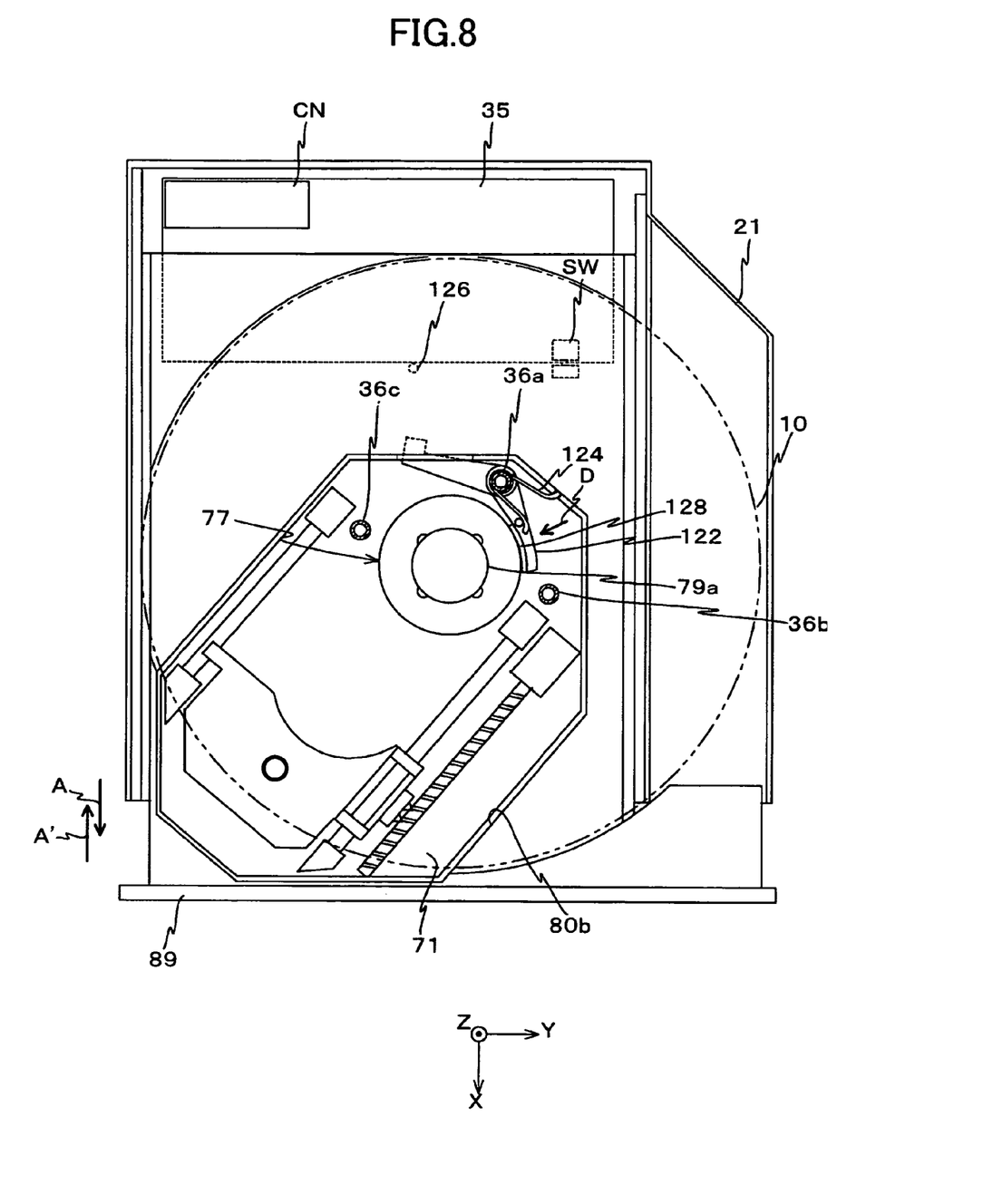
FIG. 8 is a view for explanation of a state of the braking mechanism in a case where the tray is pushed out from a housing body.

On the other hand, as shown in FIG. 8, in a case where the tray 80 is situated at a side of the disk mounting/dismounting position closer than the standard position, the second end part of the braking lever 122 does not contact the engaging pin 126. Hence, a force in a direction shown by an arrow D is generated at the braking lever 122 based on a clockwise moment so that the elastic body 128 provided in the braking lever 122 is pushed into the turn table 77 with a force. Because of this contact with the force, in a case where the turn table 77 is rotated, the turntable 77 brakes due to a friction force generated between the turntable 77 and the elastic body 128.

In this embodiment, when the tray 80 is situated at the side of the disk mounting/dismounting position closer than the standard position, the second end part of the braking lever 122 does not come in contact with the engaging pin 126. Therefore, the elastic body 128 provided on the braking lever 122 is pushed to come in contact with the turntable 77. As a result of this, the turn table 77 is securely stopped due to the friction force between the turn table 77 and the elastic body 128.

As shown in FIG. 3-(A), the head mechanism 40 is positioned at the X side and a side opposite to the Y side of the rotation-driving mechanism 32 in order to avoid mechanical interference with the circuit board 35. The head mechanism 40 includes an optical pick up PU, a driving mechanism 42, and guide shafts 44a and 44b. The driving mechanism 42 drives the optical pick up PU in directions shown by arrows B and B', namely driving directions, which obliquely cross against the X axis and Y axis. The guide shafts 44a and 44b guide the optical pick up PU in the driving direction. In this case, the driving direction shown by the arrows B and B' in FIG. 3-(A) and a radial direction of the optical disk 10 supported at the turn table 77 are set so as to be consistent with each other.

The optical pick up PU irradiates a laser beam onto a recording surface of the optical disk 10 and converts a reflection light from the recording surface to an electric signal. The optical pick up PU has an actuator (not shown in FIG. 3-(A)) for driving an object glass LS forming the optical pickup PU in the driving direction and the Z direction against the optical disk 10.

The driving mechanism 42 includes a driving motor 42a and a lead screw 42b fixed at a main axle of the driving motor 42a. The driving motor 42a is made of a rotational motor and rotationally drives the lead screw 42b. A tooth part 46 provided in the optical pick up PU engages a spiral-shaped groove forming part formed in the lead screw 42b. By rotationally driving the lead screw 42b by the driving motor 42a, a driving force in the driving direction is applied to the optical pick up PU.

The guide shafts 44a and 44b are provided in parallel with the driving direction and the optical pick up PU is slide-ably supported. By the guide shafts 44a and 44b, the optical pick PU is guided in the driving direction shown by the arrows B and B' in FIG. 3-(A).

Since the engaging pin 126 is always situated at a side opposite to the X side of the rotation-driving mechanism 32, when the tray 80 moves between the rotation position and the disk mounting/dismounting position, there is no mechanical interference between the rotation-driving mechanism 32 and the head mechanism 40.

Figure 4:
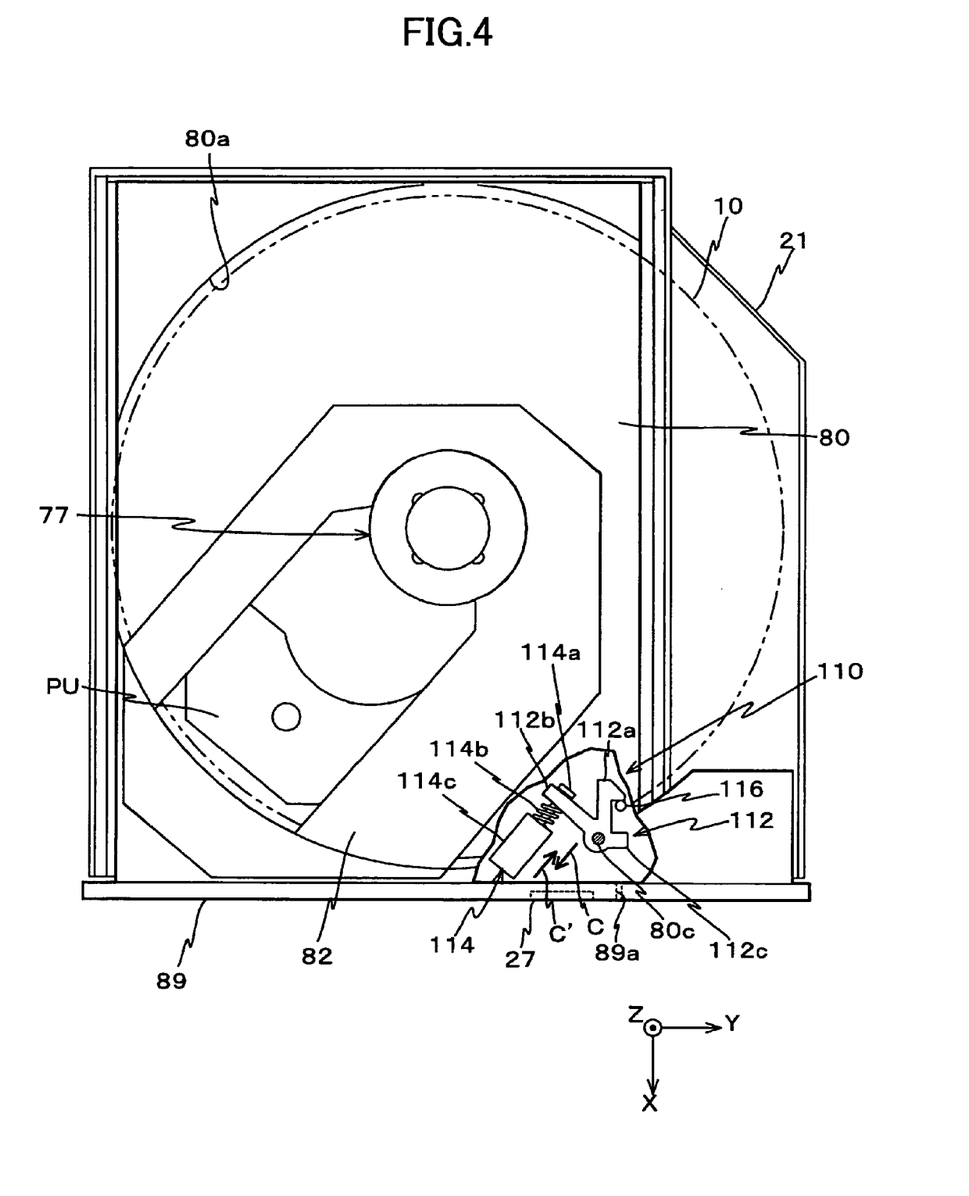
FIG. 4 is a plan view of the tray 80 in a state where the tray 80 is completely received in a housing body, an upper cover of the housing body is removed, and a part of the tray is taken off.

Meanwhile, FIG. 4 is a plan view of the tray 80 in a state where the tray 80 is completely received in a housing body 91 (that is, the tray 80 is situated at the rotation position), the upper cover 20 of the housing body 91 is removed, and a part of the tray 80 is taken off. As shown in FIG. 4, in the driving device 100 in this embodiment, the eject lock mechanism 110 is provided at a rear surface side of the tray 80 to maintain the tray 80 at the rotation position.

The eject lock mechanism 110, as shown in FIG. 4, includes a latch lever 112 and a self absorption type solenoid (hereinafter "solenoid") 114 connected to a part of the latch lever 112.

The latch lever 112 includes a key-shaped first projection part 112a, a second projection part 112b engaged with the solenoid 114, and a third projection part 112c whose projection amount is least. The latch lever 112 is rotatably supported around an axle 80c projecting to a rear surface side of the tray 80. The hole 89a for emergency discharging is formed at a position facing the third projection part 112c.

The solenoid 114 includes a solenoid main body 114c and a driving shaft 114a supported by the solenoid main body 114c so as to move in directions shown by arrows C and C' in FIG. 4. A compression spring (hereinafter "spring") 114b is provided at the driving shaft 114a. By supplying an electric current to the solenoid main body 114c, the driving shaft 114a is driven in a direction shown by the arrow C. Based on the stopping of the supply of the electric current to the solenoid 114c, the driving shaft 114a is driven in the direction shown by the arrow C' by a restoring force of the spring 114b, namely a force to return to an original position.

Figure 5:
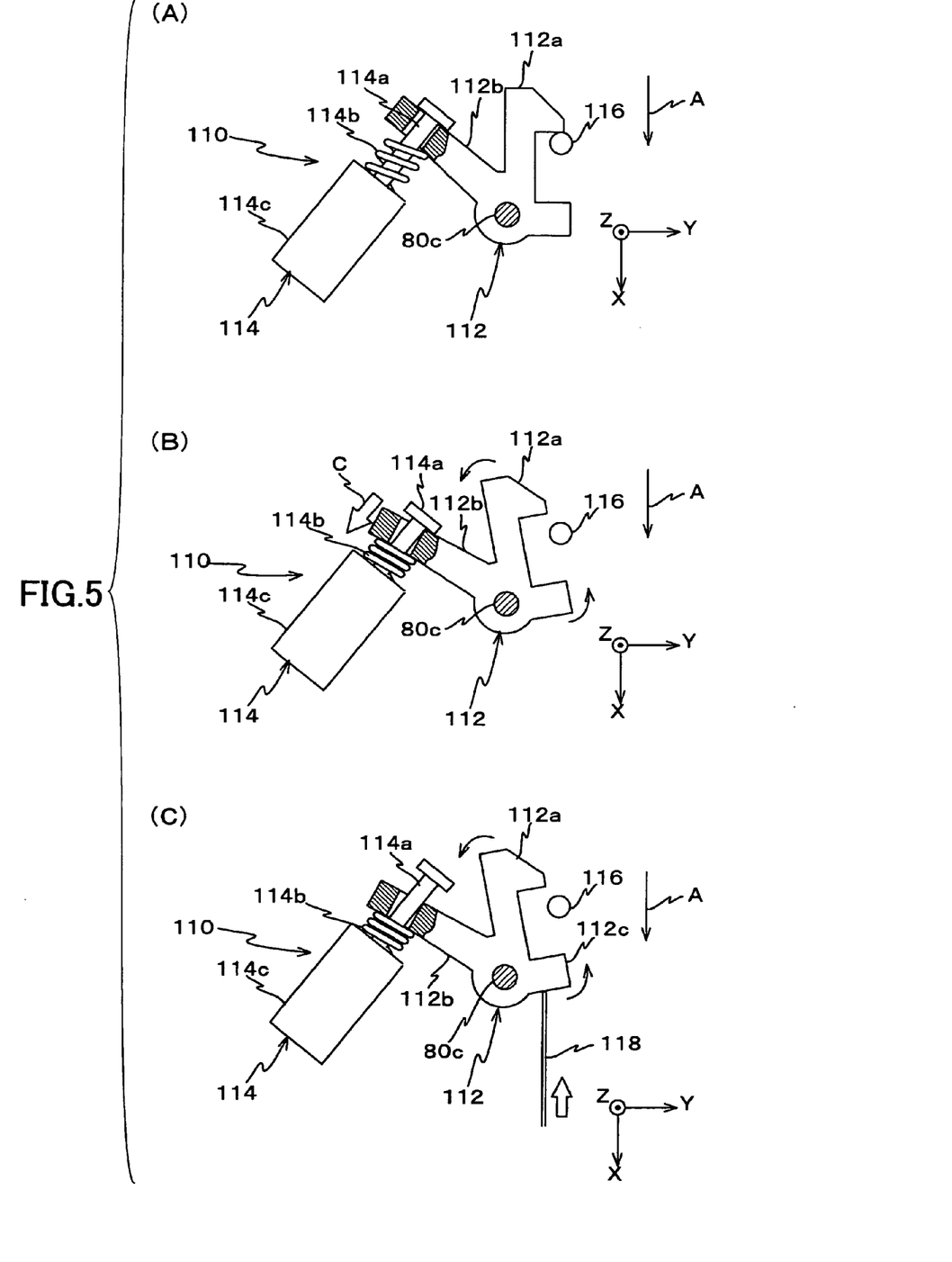
FIG. 5 is a view for explanation of an eject lock mechanism.

According to the eject lock mechanism 110 having the above discussed structure, when the tray 80 is at the rotation position, for example, as shown in FIG. 5-(A), the key-shaped first projection part 112a of the latch lever 112 is engaged with a lock pin 116 projecting to an upper surface of the lower cover 21 of the housing body 91. In this case, a force by the spring 41 (See FIG. 2) for discharging the tray is applied to the tray 80 so that the tray 80 may be pushed out in the direction shown by the arrow A. However, since the latch lever 112 is engaged with the lock pin 116, the tray 80 is maintained at the rotation position.

When the tray 80 is at the rotation position and the eject button 27 is pushed by the user, information about this is sent to the control part (not shown in FIG. 5-(A)) and the control part directs a supply of an electric current to the solenoid main body 114c. When the electric current is supplied to the solenoid main body 114c, as shown in FIG. 5-(B), the driving shaft 114a of the solenoid 114 is driven in the direction shown by the arrow C so as to work against the elastic force of the spring 114b and the latch lever 112 is rotationally driven counterclockwise where the shaft 80c is the center of the rotation. Because of this, the engagement with the key-shaped first projection part 112a of the latch lever 112 and the lock pin 116 is turned off. In this case, since the force in the direction shown by the arrow A is applied to the tray 80 by the spring 41 for discharging the tray, the engagement between the latch lever 112 and the lock pin 116 is turned off and the tray 80 is pushed out in the direction shown by the arrow A. After that, when the electric current is stopped being supplied, the solenoid 114 returns to the original state due to a restoring force of the spring 114b while the engagement between the latch lever 112 and the lock pin 116 is being turned off.

When the tray 80 is situated at the rotation position, as shown in FIG. 5-(C), and a stick shaped member 118 is inserted into the hole 89a for emergency discharging by the user, the third projection part 112c of the latch lever 112 is pushed in a direction opposite to the X direction so that the latch lever 112 is rotationally driven counterclockwise in a state where the shaft 80c is the center of the rotation. Because of this, as well as the case shown in FIG. 5-(B), the engagement between the key-shaped first projection part 112a of the latch lever 112 and the lock pin 116 is turned off. In this case, since the force in the direction shown by the arrow A is applied to the tray 80 by the spring 41 for discharging the tray, the engagement between the latch lever 112 and the lock pin 116 are turned off and at the same time the tray 80 is pushed out in the direction shown by the arrow A.

Next, an action of the driving device 100 having the above-discussed structure is explained. As an assumption of the action, the tray 80 is, as shown in FIG. 1, pulled out from the housing body 91 so as to be at the disk mounting/dismounting position.

First, the optical disk 10 is set on the turn table 77 of the tray 80 by the user. Alternatively, in a case where another optical disk is already set, the disk is exchanged for a new optical disk 10 by the user. Then, the tray 80 is pushed in the direction shown by the arrow A' in FIG. 1 by the user so as to be moved from the disk mounting/dismounting position to the rotation position. On the way of moving of the tray 80, when the tray 80 arrives at the standard position, the surface of the elastic body 128 provided at the first end part of the braking lever 122 comes in contact with the turn table 77 (and the rotor 75) and at the same time the end surface of the projection part of the second end part comes in contact with the stopper 126. When the tray 80 moves in the direction shown by the arrow A', the elastic body 128 provided at the braking lever 122 is separated from the turn table 77.

Thus, a state is changed from the state shown in FIG. 8 to the state shown in FIG. 6 via the state shown in FIG. 7.

When the tray 80 is further pushed so as to be completely received in the housing body 91 and arrive at the rotation position, the first projection part 112a of the latch lever 112 forming the eject lock mechanism 110 and the lock pin 116 are engaged (lock situation). Furthermore, a detection switch SW detects that the tray 80 is positioned at the rotation position so that its detection signal is transmitted to a control part (not shown). The control part rotates the rotation driving mechanism 32 (turntable 77) and at the same time a laser beam is irradiated from the optical pick up PU. Light reflected by the optical disk 10 is converted into an electric signal so that disk information, file managing information, and others recorded in a designated area of the optical disk 10 are read out via the LSI. Then, the control parts stops the rotational driving of the rotation driving mechanism 32.

Then, corresponding to an action starting order by the user, the optical disk 10 is rotationally driven and the laser beam is irradiated from the optical pick up PU, so that recording and reproduction of user data are performed in and from the optical disk 10.

After use (recording, reproduction, and others) of the optical disk 10 is completed and the eject button 27 provided in the front panel 89 is pushed by the user, the control part (not shown) supplies an electric current to the solenoid 114 forming the eject lock mechanism 110 so that a lock by the eject lock mechanism 110 is turned off. Because of this, the tray 80 received in the housing 91, due to the elastic force of the tray discharge spring 41, is slightly pushed out in the direction shown by the arrow A in FIG. 1 and FIG. 2, so that the tray 80 is positioned at the side of the disk mounting/dismounting position closer than the standard position. At this time, as shown in FIG. 8, the elastic body 128 comes in contact with the turn table 77 and a friction force is applied to the turntable 77, so that the rotation of the turntable 77 is braked.

That is, in the driving device 100 of this embodiment, when the tray 80 is pulled out from the housing body 90, the rotation of the turntable 77 is braked by the braking mechanism 120 and therefore the rotation of the optical disk 100 is stopped in a short period of time.

The tray 80 is pulled out to the disk mounting or dismounting position so that the used optical disk 10 can be collected and exchanged for a new optical disk.

Meanwhile, due to a power cut or a malfunction of the device, it may not be possible to discharge the optical disk by the above-discussed eject button 27. In this case, a stick-shaped member is inserted into the hole forming part 89*a* for emergency discharge by the user so that the lock of the eject lock mechanism 110 can be turned off as shown in FIG. 5-(C). In this case, as shown in FIG. 8, when the tray 80 is pulled out to the outside of the housing body 91, the rotation of the turntable 77 is braked by the braking mechanism 120 and therefore the rotation of the optical disk 10 can be stopped in a short period of time.

As discussed above, in this embodiment, the brake device is formed by the braking device 120 and the engaging pin 126.

Thus, according to the driving device 100 of this embodiment, the tray 80 is installed in the housing body 91 so as to be capable of moving between the rotation position (first position) inside of the housing body 91 and the disk mounting/dismounting position (second position) outside of the housing body. In addition, the tray 80 includes the rotation driving mechanism 32, the braking mechanism 120 and the head mechanism 40. The rotation driving mechanism 32 supports and rotationally drives the optical disk 10. The braking mechanism 120 brakes the rotation of the turn table 77 by making contact between a part of the braking mechanism 120 and the rotational part (turn table 77) of the rotation driving mechanism 32 so that a friction force is generated when the tray 80 is situated at a side of the disk mounting/dismounting position closer than the standard position. When the tray 80 is situated at a side of the disk mounting/dismounting position closer than the standard position, contact of (application of the friction force) the braking mechanism 120 with the turn table 77 is turned off by the engaging pin 126 provided in the housing body 91. Therefore, since the contact of the turntable 77 by the braking mechanism 120 is turned off when the disk 10 is attempted to be rotationally driven at the rotation position, the rotation driving mechanism 32 can be rotationally driven without braking the rotation. When the tray 80 starts moving for disk exchange from the rotation position to the disk mounting/dismounting position, the elastic body 128 of the braking mechanism 120 continues contacting the turn table 77 at the side of the disk mounting/dismounting position closer than the standard position so that the friction force keeps being applied to the turn table 77 and the rotation of the turntable 77 is braked. Therefore, when the tray 80 is positioned at the disk mounting/dismounting position, the rotation of the optical disk 10 is substantially in a stopping state. Hence, for ejecting of the disk 10, it is possible to stop the rotation of the disk 10 in a short period of time. Furthermore, since the braking mechanism 120 comes in contact with the turn table 77 and applies the friction force to the turn table 77 to brake the rotation, it is possible to stop the rotation of the optical disk 10 in a short period of time irrespective of the diameter of the optical disk 10 when the optical disk 10 is discharged.

Furthermore, in this embodiment, the torsion spring 124 is used as a force application part. Hence, it is possible to apply a designated application force to the braking lever 122 in a direction in which the braking lever 122 comes in contact with the turn table 77 with a simple structure.

The engaging pin 126 provided at the lower cover 21 of the housing body 91 is used as a lifting part. Hence, when the tray 80 is in the vicinity of the rotation position, it is possible to apply a force against the application force applied by the force application part 124 to the braking lever 122 under a simple structure.

Furthermore, since the force application part 124 and the lifting part 126 have the above discussed structures, it is possible to implement contact and separation actions of the braking mechanism 120 to the turn table 77 by using the movement of the tray 80 to the inside or the outside of the housing body 91.

In addition, in this embodiment, the boss 36*a* provided for fixing the rotation driving mechanism 32 to the tray 80 functions as a shaft for the rotation of the braking lever 122. Hence, it is possible to provide the braking lever 122 at the designated position without providing another shaft and under a simple structure.

Furthermore, in this embodiment, the elastic body 128 is provided at a part of the braking lever 122 where the braking lever 122 comes in contact with the turn table 77. Hence, it is possible to obtain a secure braking force without damaging the turntable 77. In addition, the elastic body 128 has a circular arc configuration which is consistent with the external circumference of the turn table 77. Hence, it is possible to obtain a secure braking force, prevent uneven frictional wear, and improve durability.

In addition, the detection switch as a detection part configured to detect that the tray 80 is in the rotation position is provided in this embodiment. When the tray 80 moves from the disk mounting/dismounting position to the rotation position, the contact of the braking lever 122 (elastic body 128) with the turn table 77 is turned off before the detection by the detection switch. Hence, the optical disk is prevented from being rotationally driven in a braking state.

Furthermore, in this embodiment, the head mechanism 40 including the optical pick up PU is arranged at the side of the disk mounting/dismounting position of the rotation driving mechanism 32. The engaging pin 126 is arranged at a position which is not overlapped with a moving locus of the head mechanism 40 when the tray 80 moves between the rotation position and the disk mounting/dismounting position. Hence, it is possible to avoid mechanical interference between the engaging pin 126 provided in the housing body 91 and the head mechanism 40. Also, the degree of freedom in designing can be increased and it is possible to make the driving device thinner than the conventional driving device.

Figure 9:
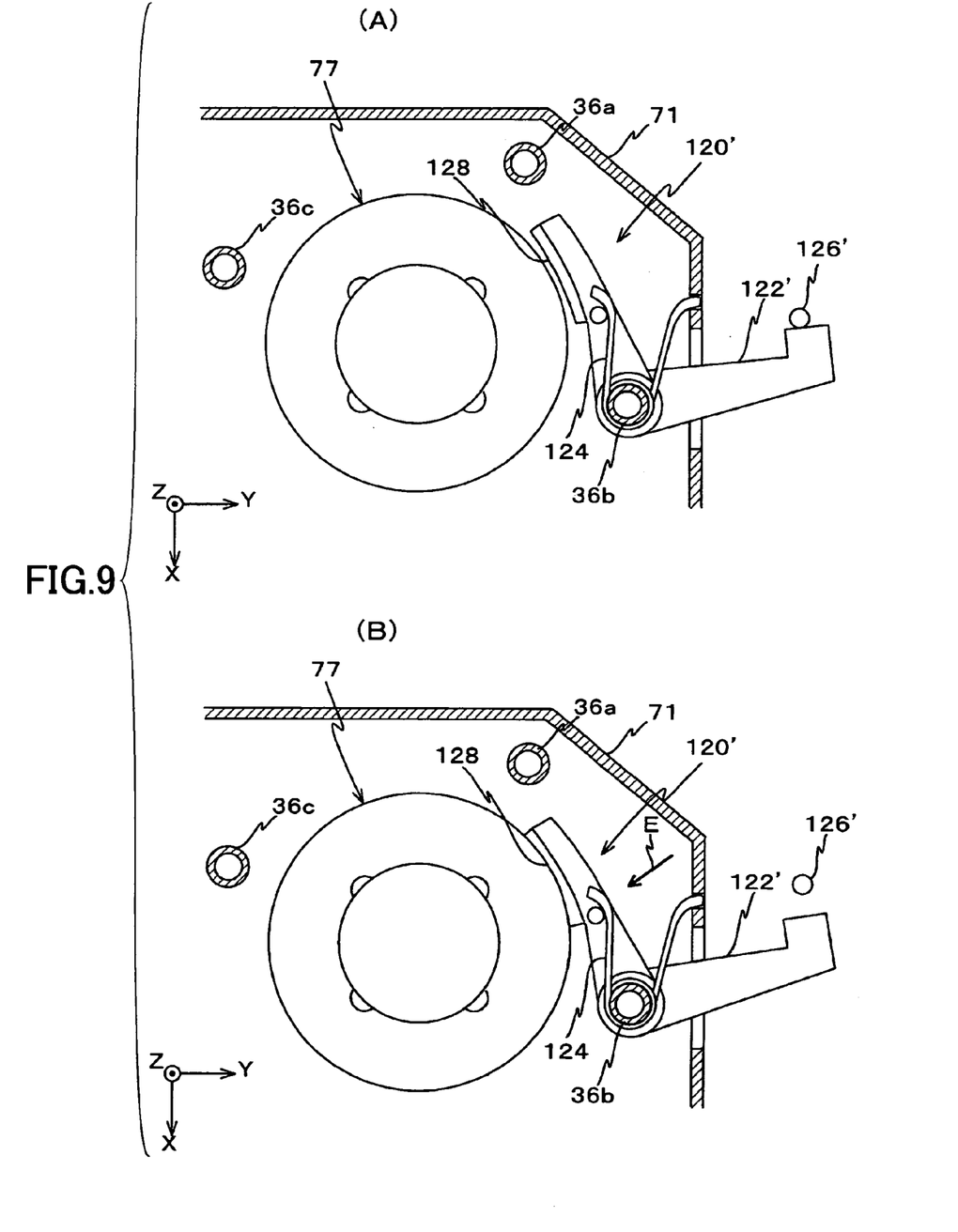
FIG. 9 is a view for explanation of a modification example of the braking mechanism.

In the above-discussed embodiment, the braking lever is rotatably provided at the boss 36*a* which is one of three bosses 36*a* through 36*c*. The present invention is not limited to this. As shown in FIG. 9-(A) and FIG. 9-(B), the braking lever may be provided at the boss 36*b*.

In this case, by using a braking mechanism 120' having a braking lever 122' having a substantially V-shaped configuration as a braking lever, it is possible to provide an engaging pin 126' at the Y side of the base 71, namely a position not overlapped with the moving locus of the rotation driving mechanism 32 when the tray 80 moves between the rotation position and the disk mounting/dismounting position.

In the braking mechanism 120', when the tray 80 is at a side of the rotation position closer than the standard position, as shown in FIG. 9-(A), the Y side end part of the braking lever 122' is pushed to the engaging pin 126' so that a force against the elastic force of the torsion spring 124 is applied to the braking lever 122'. Because of this, as shown in FIG. 9-(A), the elastic body 128 provided at a side opposite to the Y side end part of the braking lever 122' is separated from the turn table 77.

On the other hand, when the tray 80 is at a side of the disk mounting/dismounting position closer than the standard position, as shown in FIG. 9-(B), the Y side end part of the braking lever 122' does not come in contact with the engaging pin 126'. Hence, an application force in the direction shown by the arrow E is generated at the braking lever 122 so that the elastic body 128 provided at the braking lever 122' comes in contact with the turn table 77.

That is, even in the case where such the braking mechanism 120' is used, it is possible to obtain an effect the same as the above-mentioned embodiment.

In the above-discussed embodiment, the braking mechanism 120 has only a mechanism for mechanically reducing the rotational speed of the turn table 77 by contacting the turn table 77. The present invention is not limited to this. For example, the braking mechanism 120 of the present invention can be used together with a part configured to brake the turn table 77 by rotating the spindle motor 74 in a direction reverse to the direction when the recording, reproduction, or another is performed. In this case, it is possible to stop the rotation of the turntable 77 in a further short period of time.

As a braking member, not only the braking member of the above-discussed embodiment and modified embodiment but also various structures can be applied. In addition, the lifting part is not limited to the engaging pin of the above-discussed embodiment and modified embodiment. The lifting part may have any structure whereby a force against the application force of the force application part (torsion spring 124) can be applied to the braking lever when the tray 80 is situated at the side of the rotation position closer than the standard position. In addition, not only a single member such as the engaging pin but also a lifting part having a mechanical structure may be used. As the force application part, not only the torsion spring 124 but also a compression coil spring, a rubber member, or another elastic member can be used.

The braking part may have any structure where the braking part can come in contact with the turntable 77 and the contact can be lifted. The braking part may not use the force application part such as the torsion spring 124. In this case, the lifting part may have any structure whereby the contact against the turntable 77 of the braking part can be lifted. That is, the braking part may have any structure as long as the braking part is provided in the tray 80, and a part of the braking part comes in contact with the turn table 77 when the tray 80 is situated at the side of the disk mounting/dismounting position closer than the standard position, so that the rotation of the turntable can be braked. The lifting part may have any structure as long as the lifting part is provided in the housing body 91, and the contact of the braking part against the turntable 77 can be lifted when the tray 80 is situated at the side of the rotation position closer than the standard position.

In the above-discussed embodiment, the elastic body 128 is provided at a part where the braking lever 122 and the turn table 77 contact each other. The present invention is not limited to this and the elastic body may not be provided. In this case, a part of the braking lever 122 where the turntable 77 comes in contact may have a circular arc-shaped configuration.

Furthermore, in the above-discussed embodiment, a part of the elastic body 128 is provided in the braking lever 122 where the turntable 77 comes in contact has the circular arc shaped configuration. The present invention is not limited to this. The part of the elastic body 128 provided in the braking lever 122 where the turntable 77 comes in contact may have various configurations corresponding to necessary braking force, such as a plane configuration and concave and convex configurations.

In this embodiment, the tray 80 is slightly pushed out from the housing body 91 by using the tray discharge spring 41 and then by manual effort of the user. The present invention is not limited to this. A tray driving mechanism whose driving force is a motor may be used as a part configured to drive the tray 80. Furthermore, the tray 80 may be driven by a driving mechanism wherein an actuator other than the motor is used.

Furthermore, in this embodiment, when the eject button 27 is pushed by the user, the eject lock mechanism 110 is lifted. The present invention is not limited to this. For example, the eject lock mechanism 110 may be lifted based on an order from a host such as a disk load order or disk discharge order.

In addition, in this embodiment, the brake device includes the braking mechanism 120 as a braking part and the engaging pin 126 as a lifting part. The brake device may have any structure where the brake device applies the friction force for braking when the tray 80 is situated at the side of the disk mounting/dismounting position closer than the standard position, which is between the disk mounting/dismounting position and the rotation position, and where the application of the friction is turned off when the tray 80 is situated at the side of the rotation position closer than the standard position.

Furthermore, in this embodiment, an optical disk in conformity with a CD group standard is used for the drive device 100. The present invention is not limited to this. For example, a drive device for an optical disk in conformity with a DVD group standard, an optical disk in conformity with a standard for a next generation DVD group for which a laser beam having a wavelength of approximately 405 nm is employed, and an optical disk in conformity with a laser disk (LD) standard, may be used. A drive device corresponding to plural kinds of optical disks having different standards may be used. A medium other than the optical disk may be used as the information recording medium. That is, any information recording medium which rotates for at least reproduction among the reproduction, recording and deletion of information, may be used.

In addition, in this embodiment, the horizontal arrangement type drive device in which a mounting surface of the optical disk is a horizontal surface is used. A vertical arrangement type drive device in which a mounting surface of the optical disk is perpendicular to a horizontal surface may be used.

Furthermore, in this embodiment, the disk rotation device is used as the drive device. Any device configured to rotate a flat-shaped disk may be used. In this case, not only an information recording medium such as an optical disk but also any plane-shaped materials can be used as the plane-shaped disk.

The present invention is not limited to the above-discussed embodiments, but variations and modifications may be made without departing from the scope of the present invention.

This patent application is based on Japanese Priority Patent Application No. 2003-421789 filed on Dec. 19, 2003, the entire contents of which are hereby incorporated by reference.

What is claimed is:

1. A disk rotation device rotationally driving a disk, comprising:
   a housing body;
   a conveyance body installed in the housing body so as to be capable to move between a first position positioned inside of the housing, the first position being where the disk is rotation driven, and a second position positioned outside of the housing body, the second position being where the disk is put on or taken off;

a rotation mechanism provided in the conveyance body and having a rotational part which is rotationally driven by a motor and at which rotational part the disk is set; and a braking device which brakes by applying a friction force to the rotational part in a case where the conveyance body is situated at a side closer to the second position than to a designated standard position, and which turns off application of the friction force in a case where the conveyance body is situated at a side closer to the first position than to the standard position, wherein the standard position is located between the first position and the second position.

2. The disk rotation device, as claimed in claim 1, wherein the braking device includes:

a braking part provided in the conveyance body and configured to apply the friction force to the rotational part in a case where the conveyance body is situated at the side closer to the second position than to the standard position; and a lifting part provided in the housing body and configured to turn off application of the friction force to the rotational part in a case where the conveyance body is situated at the side closer to the first position than to the standard position.

3. The disk rotation device as claimed in claim 2, wherein the braking part includes:

a force application part; and a braking member to which a force is always applied in a designated direction by the force application part and which comes in contact with the rotational part in a case where the conveyance body is situated at the side closer to the second position than to the standard position.

4. The disk rotation device as claimed in claim 3, wherein a part of the braking member which comes in contact with the rotational part is made of an elastic body.

5. The disk rotation device as claimed in claim 3, wherein the rotational part has a circular-shaped configuration, and a part of the braking member which comes in contact with the rotational part has a circular arc-shaped configuration corresponding to an external circumference of the rotational part.

6. The disk rotation device as claimed in claim 3, wherein the lifting part includes a stopper preventing the braking part from coming in contact with the rotational part, by opposing the force applied from the force application part, in a case where the conveyance body is situated at the side closer to the first position than to the standard position.

7. The disk rotation device as claimed in claim 6, wherein the braking member has a first end part pressure-contacting the rotational part and a second end part different from the first end part, the braking member is rotatably supported in a state where a rotation shaft is provided as a center of the rotation and between the first end part and the second end part, and the stopper is fixed to a position on the housing body at which the stopper can come in contact with the second end part in a state where the conveyance body is situated at the side closer to the first position than to the standard position.

8. The disk rotation device as claimed in claim 7, wherein a boss is provided to fix the rotation mechanism to the conveyance body and functions as the rotation shaft of the braking member.

9. The disk rotation device as claimed in claim 6, wherein the disk is an information recording medium, the disk rotation device further includes a head mechanism which is provided in the conveyance body and which performs at least reproduction among the reproduction, recording and deletion of information in the information recording medium, the head mechanism is situated at the side closer to the second position of the rotation mechanism in a moving direction of the conveyance body, and the stopper is situated at a position not overlapping a moving locus of the head mechanism in a case where the conveyance body moves between the first position and the second position.

10. The disk rotation device as claimed in claim 9, wherein the stopper is situated at a position which is at the side closer to the first position of the rotation mechanism in a case where the conveyance body is at the first position.

11. The rotation device as claimed in claim 9, wherein the disk is an optical disk, and the head mechanism includes an optical pick up.

12. The disk rotation device as claimed in claim 1, further comprising:

a detection part configured to detect that the conveyance body is at the first position;

wherein the application of the friction force against the rotational part by the braking device is turned off prior to a detection by the detection part, in a case where the conveyance body moves from the second position to the first position.

\* \* \* \* \*